(12) United States Patent
Parkinson et al.

(10) Patent No.: US 10,545,573 B1
(45) Date of Patent: Jan. 28, 2020

(54) AUTOMATICALLY ADJUSTING HEAD-MOUNTED DISPLAY

(71) Applicant: RealWear, Incorporated, Suite 120, CA (US)

(72) Inventors: Christopher Iain Parkinson, Richland, WA (US); Stephen A. Pombo, Campbell, CA (US); Kenneth Lustig, Mercer Island, WA (US)

(73) Assignee: REALWEAR, INC., Vancouver, WA (US)

( * ) Notice: Subject to any disclaimer, the term of this patent is extended or adjusted under 35 U.S.C. 154(b) by 0 days.

(21) Appl. No.: 16/035,382

(22) Filed: Jul. 13, 2018

(51) Int. Cl.
*G06F 3/01* (2006.01)
*G06F 3/0346* (2013.01)
*G10L 15/22* (2006.01)

(52) U.S. Cl.
CPC .............. *G06F 3/012* (2013.01); *G06F 3/013* (2013.01); *G06F 3/0346* (2013.01); *G10L 15/22* (2013.01); *G10L 2015/223* (2013.01)

(58) Field of Classification Search
CPC ........ G06F 3/012; G06F 3/013; G06F 3/0346; G10L 15/22; G10L 2015/223
See application file for complete search history.

(56) References Cited

U.S. PATENT DOCUMENTS

| 2008/0291277 | A1* | 11/2008 | Jacobsen | G02B 27/0172 348/158 |
| 2009/0243970 | A1* | 10/2009 | Kato | G02B 27/0176 345/8 |
| 2018/0011326 | A1* | 1/2018 | Ishizaki | G02B 27/02 |

* cited by examiner

*Primary Examiner* — Premal R Patel
(74) *Attorney, Agent, or Firm* — Shook, Hardy & Bacon L.L.P.

(57) ABSTRACT

Systems and methods are provided for automatically positioning a head-mounted display. The head-mounted display allows for hands-free engagement between a user and a wearable display. The automatic positioning may align the display with a landmark on the user, such as the user's eye or the user's iris, or with other components of the wearable display. User preferences for the position of the display may be saved for recall during later use.

19 Claims, 7 Drawing Sheets

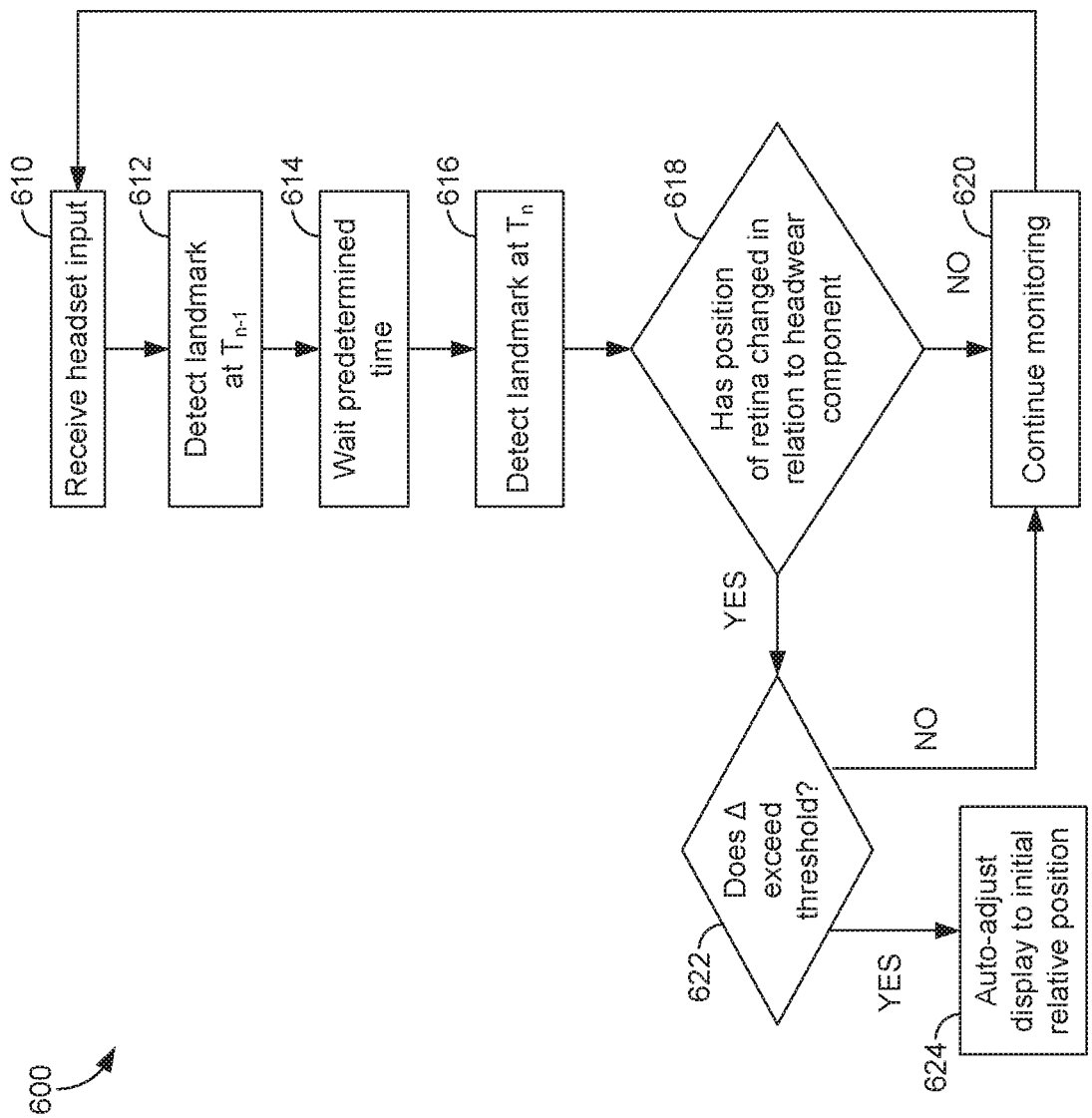

AUTOMATICALLY ADJUSTING HEAD-MOUNTED DISPLAY

BACKGROUND

Wearable computing devices, such as those with head-mounted displays, provide a variety of user conveniences, such as portability and on-the-go access to information. Wearable computing devices, more particularly those with head-mounted displays, enable users to view electronic information, and sometimes interact with the computing device while otherwise remaining engaged in other tasks. Some head-mounted displays are configured for hands-free use, employing features such as operations activated based on detected voice command, head gestures, or optically-detected hand gestures. Such devices can be beneficial to industries requiring easy access to information while remaining hands-free.

BRIEF SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter in isolation from the rest of the disclosure, including the drawings.

This disclosure generally relates to hands-free positioning of a head-mounted display, and more particularly, to automated readjustment of a head-mounted display to a preferred position. Head-mounted displays may allow a user to transport and use technology while limiting the need to use one or both hands to hold or operate the technology. For example, a head-mounted display may present information to a user, in a manner similar to a tablet computer or smartphone, but without needing to hold the device to see the information or operate the device. A head-mounted display can be challenging to position, as each user may have a unique preference. A user may desire that the display lie neither too close nor too far from the user's face, within the field of view but without fully blocking the user's view of what is happening behind the display. This involves positioning the display in preferred x- and y- and z-directions, and also controlling the tilt of the display around the x-, y- and/or z-axes. Once positioned, the display may be unintentionally displaced. For example, if the head-mounted display is donned (i.e., worn) directly on the user's head or, if the head-mounted display is secured to headgear (e.g., helmet, hat, bump cap) worn by the user, and the head-mounted display is displaced, relative to the user's (e.g., the wearer's) head, the head-mounted display may no longer be positioned acceptably according to the user's preferences. Strong winds or other forces may move the display from the desired position during use, relative to the headgear or the user or both. In some circumstances, the user may want to move the display out of position, e.g., to increase the unobstructed portion of the user's field of view, or if the display is not immediately in use, and then want to return the display to the previously set position. A millimeter shift in the position of the display can be a user-noticeable misalignment. Regardless of whether the display is moved accidentally or intentionally, repositioning the display manually may be unacceptably time-consuming or may require the availability of one or both hands. This disclosure describes, among other things, methods and systems for automatically establishing, maintaining and/or restoring a user-specified position for a head-mounted display.

In some aspects, the disclosure provides a display unit. The display unit comprises an attachment for joining the display unit to a body of a wearable computing device donned on the head of a user, or secured to an article of headwear worn by the user. The wearable computing device comprises a display boom with a first end adjustably secured to and extending from a body of the wearable computing device, and a second end adjustably secured to an attachment component of a display. The display boom can be coupled to at least one actuator configured to adjust the position of the display, whereby any number of actuators can be coupled to the display boom at the first and/or second ends.

The wearable computing device can include an optical and/or audio input device in coupled communication with at least one computer processor housed in the body of the wearable computing device. The computer processor(s) can be configured to activate any number of the at least actuator to adjust the position and/or orientation of the display based on instructions generated thereby. The instructions can be generated based on, among other things, optical data received from the optical input device, and position and/or orientation data received from an accelerometer and/or gyroscope of the wearable computing device. The instructions can also be generated in response to recognized voice commands received from the audio input device, such as voice commands determined to correspond to defining a preferred position and/or orientation of the display for a user when the display is in the preferred position and/or orientation, or such as voice commands determined to correspond to readjusting a current (e.g., displaced) position and/or orientation of the display back to the defined preferred position and/or orientation.

The computer processor(s) may be configured to receive and identify, based on optical input from a front-facing camera or other front-facing optical input device, a landmark on a user's eye or face when the display unit is worn. The optical input device can include, among other things, a camera, an eye tracking device, a laser, an infrared camera, and the like. The preferred position and/or orientation can be defined based on determined features of the identified landmark, such as where identifiable features (e.g., iris, retina, eye, eye brow, nose, nostril, mouth, ears, cheeks, jawline) of the landmark are positioned within a frame of the optical input data, how the identifiable features are positioned relative to another, displacement value(s) of an optical lens when the optical input device is an eye tracking device, or any combination thereof, among other things. The computer processor(s) may be configured to automatically, or in response to a recognized voice command, determine a current position and/or orientation of the display relative to the identified landmark, and activate any number of the at least one actuator when the position and/or orientation of the display diverges by at least a predetermined variance from the preferred position and/or orientation defined relative to the identified landmark. The number of at least one actuator(s) can be activated to move the display by an amount that corresponds to a determined displaced value(s) of the current position and/or orientation, the determined displaced value(s) being determined based on a calculated variance between the current position and/or orientation and the defined preferred position and/or orientation.

The computer processor(s) can also be configured to recognize, among other things, a head gesture of a user based on movement data received from the gyroscope or accelerometer to responsively determine the displaced value(s) and activate any number of the at least one actuator to reposition the display back to the preferred position and/or orientation. Similarly, the wearable computing device may further include a front facing camera adapted to receive optical data, such that when a hand gesture is detected based on the received optical data, and the hand gesture is recognized as a readjustment hand gesture, the computer processor(s) can responsively determine the displaced value(s) and reposition the display back to the preferred position and/or orientation. In the same regard, audio data, such as speech data, can be received by a microphone of the wearable computing device, which can be recognized as a speech command that corresponds to a readjustment command to responsively determine the displaced value(s) and reposition the display.

In some aspects, this disclosure provides a method for automatically positioning a head-mounted display relative to an identified landmark of a wearer of a wearable computing device, the wearable computing device being coupled to the head-mounted display via a display boom that extends from a body of the wearable computing device. The method comprises accessing, by a computing system (e.g., the wearable computing device), data from a front-facing optical input device associated with a head-mounted display. The front-facing optical input device can be secured adjacent to the head-mounted display, which is positioned in front of the wearer's face when the wearable computing device is donned. The method comprises identifying, by the computing system, a facial landmark on the user of the head-mounted display based on the data received from the optical input device. The method comprises actuating, by the computing system, one or more actuators controlled by the wearable computing device and coupled to the head-mounted display to change the position or orientation of the head-mounted display relative to the identified landmark of the wearer. The landmark may be any facial feature recognizable by the wearable computing device or one or more processors thereof. A facial feature can include any number of facial features, such as the wearer's iris, retina, nose, mouth, and the like. The head-mounted display may comprise any number of articulations (e.g., rotation in the x, y, z directions) each associated with at least one actuator. The articulations can be facilitated at a coupling joint at either or both ends of the display boom, whereby the coupling joints facilitate adjustable securement of the head-mounted display to the display boom, and adjustable securement of the display boom to the body of the wearable computing device. Any number of the at least one actuator may be actuated to change the position and orientation of at least the head-mounted display relative to the identified landmark, or relative to the body of the wearable computing device. The computing system may exchange data and instructions with the head-mounted display through a direct wired connection, or wirelessly via a radio thereof. The method may comprise receiving a hands-free command to define a preferred position and/or orientation of the head mounted display when the computing system is donned by the wearer, and further initiate the automatic positioning of the head-mounted display. The method may comprise receiving one or more hands-free commands to further adjust the position of the head-mounted display after the computer has automatically repositioned the head-mounted display to the defined preferred position and/or orientation. More particularly, the method can include moving the head-mounted display to a retracted position, to displace the head-mounted display away from a general field of view of the wearer. The retracted position can be defined by the wearer, or predefined (e.g., 90-degrees up or down from the body of the wearable computing device or behind the head of the wearer).

In some aspects, this disclosure provides a method for restoring the position of a head-mounted display coupled to a wearable computing device. The method comprises accessing, by a computing system, data from an optical input device coupled to the head-mounted display. The method comprises receiving a command to define the preferred position and/or orientation of the head-mounted display when the wearable computing device is donned on a wearer's head. The method further includes identifying, by the computing system, a facial landmark of the wearer based on the data received from the optical input device when the head-mounted display is in the preferred position and/or orientation. The method includes determining a relative position and/or orientation of the head-mounted display relative to the landmark or identified features thereof, and storing the determined relative position and/or orientation as the preferred position and/or orientation. After stored, and an instruction can be received to readjust the head-mounted display to the preferred position and/or orientation, and the method comprises once again identifying, by the computing system, the facial landmark of the wearer based on current data received from the optical input device when the head-mounted display is in current preferred position and/or orientation. Once again, the method includes determining the current relative position and/or orientation of the head-mounted display relative to the identified landmark or identified features thereof. The method then includes comparing the current relative position and/or orientation of the head-mounted display relative to the previously defined preferred position and/or orientation to determine a set of displacement values. The method comprises actuating, by the computing system, one or more actuators coupled to the head-mounted display (e.g., at either or both ends of the display boom) to reposition or reorient the head-mounted display to the previously defined preferred position and/or orientation based on the determined set of displacement values. The method can include repeating any portion of the above-noted steps based on received instructions or at pre-defined time intervals.

Additional objects, advantages, and novel features of the invention will be set forth in part in the description which follows, and in part will become apparent to those skilled in the art upon examination of the following, or may be learned by practice of the disclosure.

BRIEF DESCRIPTION OF THE SEVERAL VIEWS OF THE DRAWING

The disclosure references the attached drawing figures, wherein:

FIG. 6 is an exemplary flowchart for automatically adjusting the position of a display according to aspects of the disclosure.

DETAILED DESCRIPTION

The subject matter of the present technology is described with specificity in this disclosure to meet statutory requirements. However, this description is not intended to limit the scope of the claimed invention. Rather, the claimed subject matter may be embodied in other ways, to include different steps, combinations of steps, features, and/or combinations of features, similar to the ones described in this disclosure, in conjunction with other present or future technologies. Moreover, although the terms "step" and "block" may be used to identify different elements of methods employed, the terms should not be interpreted as implying any particular order among or between various steps or blocks unless and except when the order of individual steps or blocks is explicitly described and required.

As used herein, "automatically" means that a step or process is undertaken or achieved by a computing system without user intervention. An automatic process may be initiated by a user, for example, by voice command, motion command, hand gesture, etc., but does not require manual manipulation from the user. The result of an automatic process may be modified by the user, if desired.

As used herein, "hands-free" refers to operations performed by a computing system at the instruction of a user that do not require tactile input from the user (e.g., via a mouse, keyboard, button, touchscreen, etc.). An operation can be initiated hands-free without being automatic (e.g., by accepting voice or motion commands), or can be hands-free and automatic. An automatic operation is typically hands-free, although perhaps requiring touch input to initiate the automatic operation and/or make adjustments to the initial result of the automatic operation. An automatic operation can also be initiated and adjusted using voice, motion or other hands-free commands, making the automatic operation completely hands-free.

As used herein, "joined," "connected," or "coupled to" means that two devices or components are operably connected to and/or in communication with one another, reversibly or permanently.

Figure 1:
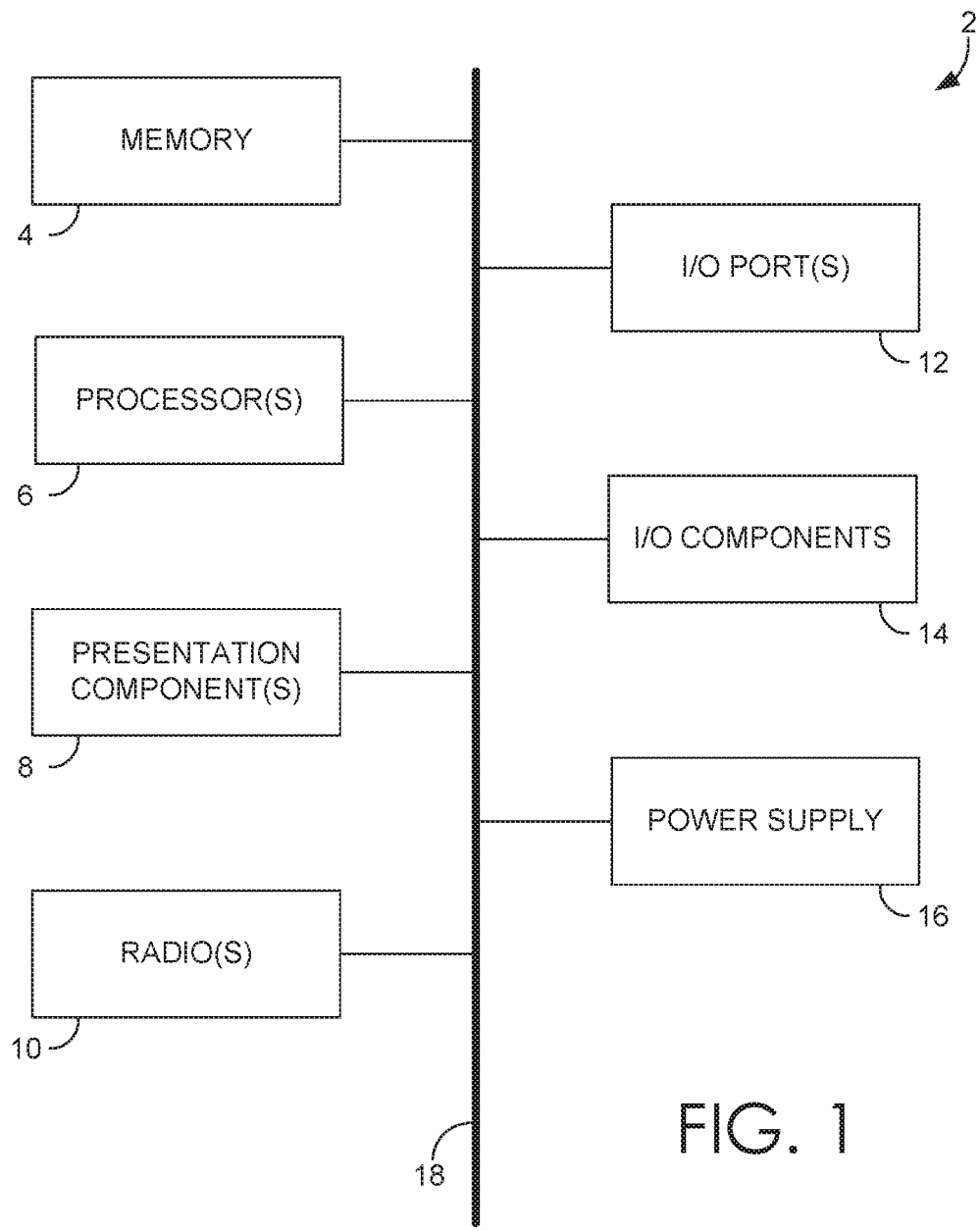
FIG. 1 is a schematic representation of an exemplary computing system in accordance with aspects of the disclosure.

Turning initially to FIG. 1, a block diagram of an exemplary computing system 2 suitable for use with embodiments of the present technology is provided. Computing system 2 includes a bus 18 that may directly or indirectly couple various components together, including memory 4, processor(s) 6, presentation component(s) 8, radio(s) 10, input/output (I/O) port(s) 12, input/output (I/O) component(s) 14, and power supply 16. It should be noted that although some components depicted in FIG. 1 are shown in the singular, they may be plural. For example, computing device 2 might include multiple memories, multiple processors and/or multiple radios. It should also be noted that additional or alternative components may be provided with computing device 2, and the configuration shown in FIG. 1 is merely exemplary. Further, some components may be excluded, or may be excluded from the contiguous physical system. For example, memory 4 may be remote, and may be accessed by radio 10 and/or other communication means.

Memory 4 may take the form of volatile or non-volatile memory. Exemplary volatile memories include ROM, PROM, and EEPROM. Exemplary non-volatile memories include RAM, DRAM, CPU cache memory, SRAM, magnetic storage devices, paper tape, punch cards, and combinations thereof. Memory 4 may take the physical form of an integrated circuit, a removable memory, a remote memory (such as a memory available on a physically remote server or storage device that can be accessed by the computing system 2 via a communications link), or combinations thereof. Memory 4 may include any type of tangible medium that is capable of storing information, such as a database. A database may include any collection of records, data, and/or other information. In one embodiment, memory 4 may include a set of embodied computer-executable instructions that, when executed, facilitate various functions or steps disclosed herein. These embodied instructions will be referred to as "instructions" or an "application" for short. Memory 4 does not extend to transitory signals.

Processor 6 may comprise one or more processors that receive instructions and process them accordingly. Presentation component 8 may include a display, a speaker, a tactile unit (vibration, heat, etc.) and/or other components that can present information through visual, auditory, and/or other tactile cues (e.g., a display, a screen, a lamp, a light-emitting diode (LED), a graphical user interface (GUI), or even a lighted keyboard).

Radio 10 may facilitate communication with a network, and may additionally or alternatively facilitate other types of wireless communications, such as Wi-Fi, WiMAX, LTE, Bluetooth, other VoIP communications, or combinations thereof. The radio 10 may be configured to support multiple technologies, and/or multiple radios may be configured and utilized to support multiple technologies.

Input/output (I/O) ports 12 may take a variety of forms. Exemplary I/O ports may include a USB jack, a stereo jack, an infrared port, a firewire port, and/or other proprietary communications ports. Input/output (I/O) components 14 may comprise one or more keyboards, microphones, speakers, touchscreens, cameras, optical sensors, motion sensors, and/or any other item usable to directly or indirectly input/output data to or from the computing device 2.

Power supply 16 may include batteries, fuel cells, and/or any other component that may act as a power source to supply power to computing device 2 or to other components, including through one or more electrical connections or couplings. Power supply 16 may be configured to selectively supply power to different components independently and/or concurrently.

Figure 2A:
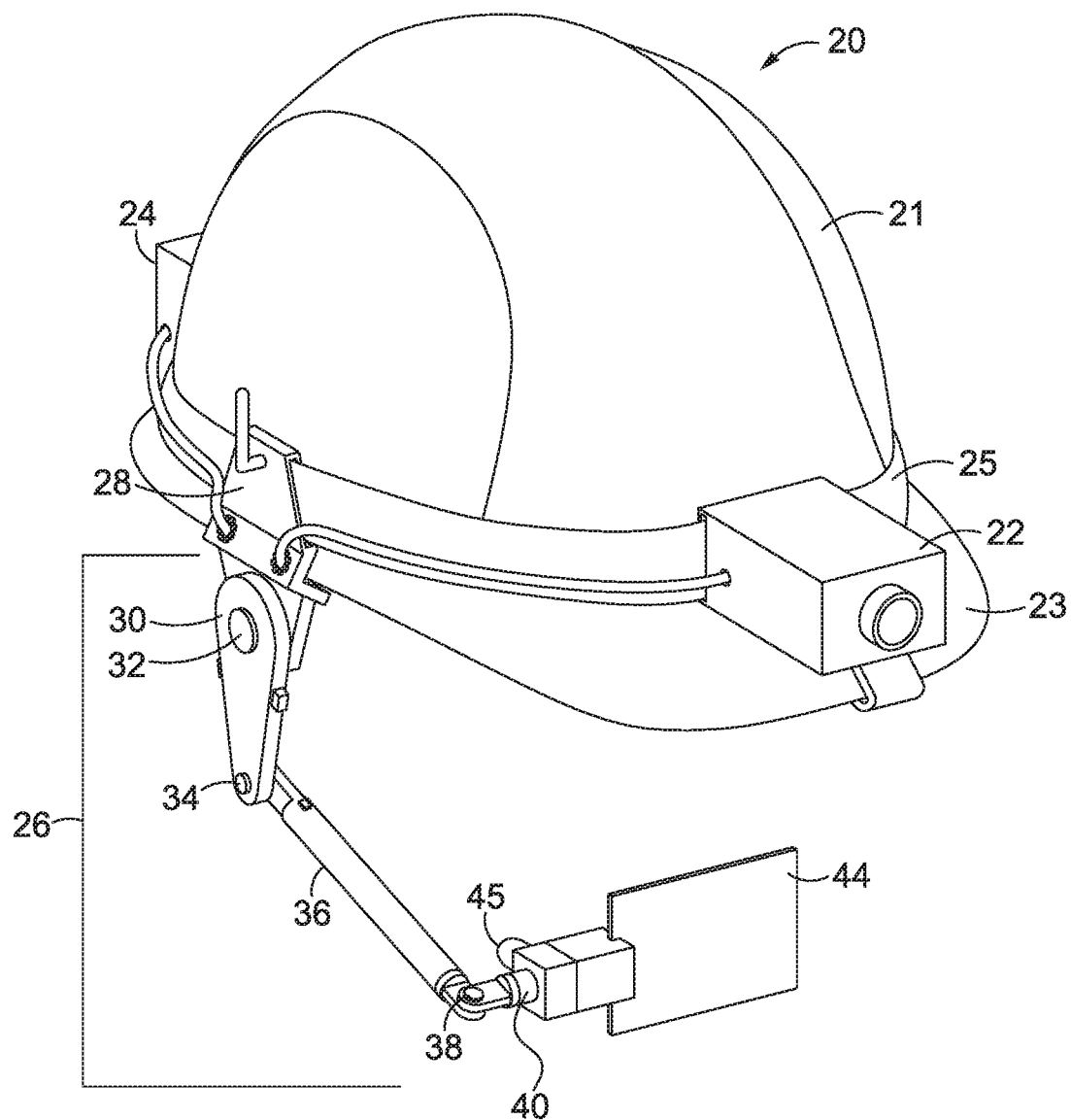
FIG. 2A is an exemplary headwear apparatus according to aspects of the disclosure.
Figure 2A:
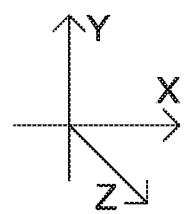

A head mounted display system comprising exemplary headwear 20 and a wearable computing device is shown in FIG. 2. As shown, headwear 20 includes a head covering 21 having a visor 23. As shown, headwear 20 is a safety hard hat, but any desirable form of headwear could be used, including, without limitation, baseball caps, a crownless visor, boaters, beanies, bucket hats, a boonie or bush hat, field cap, pith helmet, combat helmet, cowboy hat, or the like. The wearable computing device may comprise a body portion, a display portion, and a display boom 26. The body portion may comprise a means for attaching the wearable computing device and/or body portion to the headwear, at least one input device, and at least one processor. A variety of means may be used to attach the wearable computing device to the headwear 20, such as a band, harness, clip, or the like. For example, the band 25 may at least partially encircle the head covering 21 (or the user's head, if no head covering 21 is present) and may be used to connect the wearable computing device and/or other tools to the headwear 20. For example, band 25 may secure electronics module 22 to the headwear 20. Various devices can be secured to band 25 directly, for example, by means of a cavity in the device through which the band is run or by means of a press fit onto the band or a component of the band, or indirectly, e.g., by other securement means, such as clips, hook and loop tape, snaps, buttons, ties, screws, bolts, magnets or combinations thereof. As shown, the band 25 serves to attach the display 44 and other devices to the user or an article of headwear. It will be appreciated that other attachments can be used, with band 25 or as an alternative to band 25. For example, any or all of the features described herein could be incorporated directly into an article of headwear, or could be disposed within a container that can be joined to an article of headwear or to the user, or could be incorporated into or joined to a securement means for attaching the system to an article of headwear or to the head of a wearer. Electronics module 22 may comprise one or more of the memory 4, processor 6, a radio receiver and/or a radio transmitter (shown as radio 10), I/O port 12, I/O component 14, and power supply 16. Alternately or in addition to any power supply in electronics module 22, a separate power source 24 may also be joined to headwear 20. More than one electronics module 22 and/or power source 24 may be used with headwear 20.

Display 44 may be any desired kind of display, including, without limitation, LED, LCD, VGA, CCFL, XVGA, VGA, OLED, and the like. Display 44 may present a 2-D image, a 3-D image, a holographic image, or may operate in different modes to present different kinds of images at different times. Display 44 may be configured for use in bright light, for example, the display 44 may have a matte screen and/or may have relatively high brightness settings preconfigured for use in bright light. Alternately, display 44 may be configured for use in low light conditions, for example, display 44 may have relatively low brightness settings preconfigured for use in low light. The display 44 may be re-configurable to be used in different conditions, for example, using touch, voice, gesture or other commands, as described herein, or may be interchangeable so that different displays (e.g., a display with a matte screen or a display with a glossy screen) can be used at different times. Display 44 may be opaque or transparent, and may be flexible or rigid. Display 44 could also be a projection screen or deformable mirror, with a separate, corresponding projector.

In some aspects, the display 44 is joined to the wearable computing device via a display boom 26. The display boom 26 may have a first end adjustably secured to and extending from the body portion of the wearable computing device and a second end adjustably secured to an attachment component of the display. The display boom may be coupled to at least one actuator configured to adjust the position of the display whereby any number of actuators can be coupled to the display boom at the first and/or second ends.

A clip 28 may further join the display boom 26 to headwear 20. The display boom 26 may be a singular arm extending from headwear 20. As shown in FIG. 2, in aspects, the display boom 26 is articulated at four points, each marked by an actuator 32, 34, 38, 40. The actuator could be a servo motor, and the servo motor could be angular or linear, or any micro gear-based motor capable of generating enough force to move the display boom 26 or the portion of the display boom 26 associated with that motor. Exemplary actuators, including a servo motor, include, without limitation, a piezo motor, a voice coil, a memory wire, a hydraulic motor, a pneumatic motor, and combinations thereof. The display boom 26 may terminate with a frame 42, which secures display 44. By activating one or more of the actuators 32, 34, 38, 40, the arm(s), such as arms 30, 36 can establish, maintain, and/or restore a user-specified position for the display 44 in the x-, y-, and/or z-direction. Frame 42 may also house or be connected to an input device 45. The input device 45 may be in coupled communication with the at least one processor housed in the wearable computing device and could comprise, for example, be an optical sensor, such as a laser, camera, or infrared sensor, or an audio input device such as a microphone, including ultrasound microphones or sensors.

The at least one computer processor of the wearable computing device can be configured to activate any one or more of the at least one actuators to adjust the position and/or orientation of the display 44 based on instructions generated thereby. The instructions can be generated based on, among other things, optical data received from the optical input device and position and/or orientation data received from any one or more accelerometers and/or gyroscopes that may be configured in any one or more portions of the head mounted display system. The instructions can also be generated in response to recognized voice commands received from the audio input device, such as voice commands determined to correspond to defining a preferred position and/or orientation of the display for a user when the display is in the preferred position and/or orientation, or such as voice commands determined to correspond to readjusting a current (e.g., displaced) position and/or orientation of the display back to the defined preferred position and/or orientation.

The head-mounted display may comprise any number of articulations (e.g., rotation in the x, y, z directions) each associated with at least one actuator. The articulations can be facilitated at a coupling joint at either or both ends of the display boom 26, whereby the coupling joints facilitate adjustable securement of the head-mounted display to the display boom 26, and adjustable securement of the display boom to the body of the wearable computing device. Any number of the at least one actuator may be actuated to change the position and orientation of at least the head-mounted display relative to the identified landmark, or relative to the body of the wearable computing device. The computing system may exchange data and instructions with the head-mounted display through a direct wired connection, or wirelessly via a radio thereof. The method may comprise receiving a hands-free command to define a preferred position and/or orientation of the head mounted display when the computing system is donned by the wearer, and further initiate the automatic positioning of the head-mounted display. The method may comprise receiving one or more hands-free commands to further adjust the position of the head-mounted display after the computer has automatically repositioned the head-mounted display to the defined preferred position and/or orientation. More particularly, the method can include moving the head-mounted display to a retracted position, to displace the head-mounted display away from a general field of view of the wearer. The retracted position can be defined by the wearer, or predefined (e.g., 90-degrees up or down from the body of the wearable computing device or behind the head of the wearer).

Figure 3A:
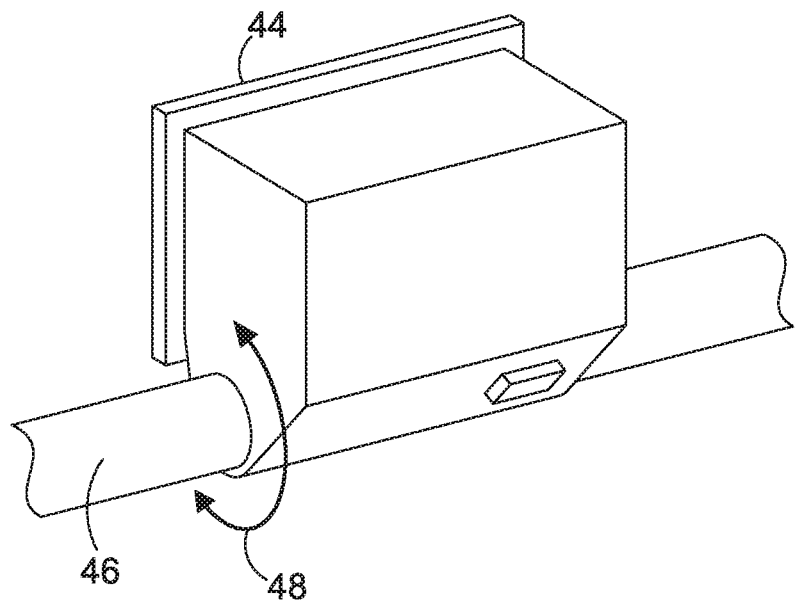
FIG. 3A is an exemplary display and a display boom according to aspects of the disclosure.
Figure 3B:
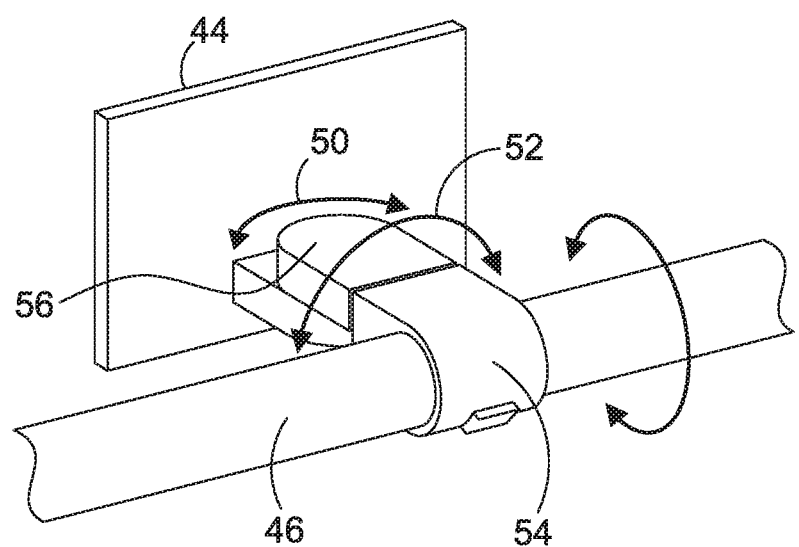
FIG. 3B is an exemplary display and display boom according to aspects of the disclosure.

FIGS. 3A and 3B show alternate frame attachments, in which display 44 is attached co-axially to an arm 46 of display boom 26. Arm 46 could terminate at frame 42 of display 44, or could continue beyond frame 42 and/or display 44. As attached in FIG. 3A, display 44 can rotate as shown by arrow 48 to adjust the position of display 44 relative to a user's field of view. As attached in FIG. 3B, display 44 is joined to a mount 54 that allows the display to rotate as shown by arrow 58 about arm 46. In FIG. 3B, display 44 is joined to the mount indirectly by one or both of mounts 56, 60, which can rotate as shown by arrow 52. Mount 60 can further rotate relative to mount 56, such that the display can be adjusted as shown by arrow 50. Additional articulations or pivot points are possible, however, three axes of rotation, or three to five axes of rotation, may enable acceptable adjustments for most purposes without overcomplicating the set-up and maintenance of the display position. Some or all of the articulations may be configured to rotate about two or more axes, for example, such that the articulation can be manipulated to change both position and tilt of display 44.

Figure 2B:
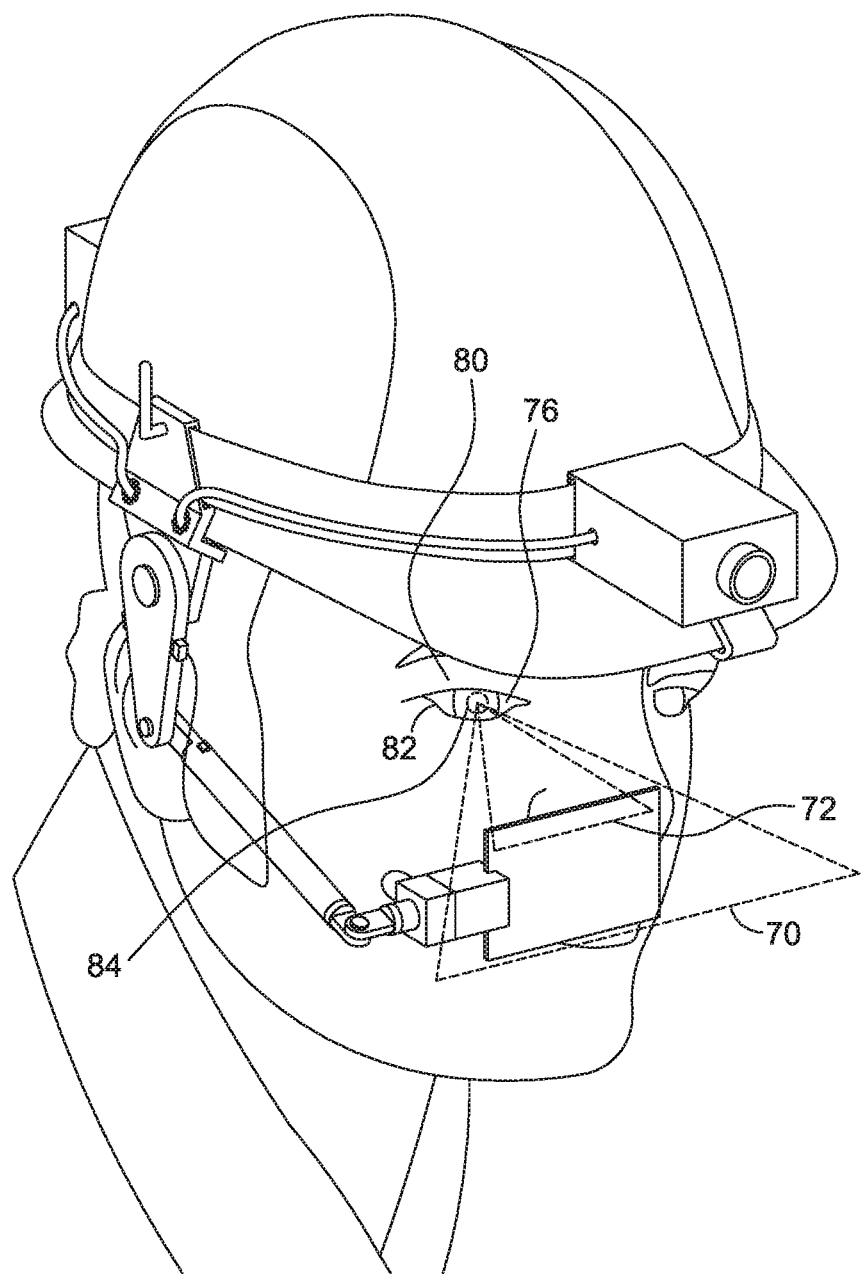
FIG. 2B is an exemplary headwear apparatus according to aspects of the disclosure.

As shown in FIG. 2B, when a user 74 dons headwear 20, display 44 will occupy a sub-arc 72 of the user's field of vision 70. Different users will have a plurality of different measurements relevant to establishing a preferred display position, possibly including the distance of the eye 76 from the top of the head, from the center of the face and/or from the user's other eye, or from a point on the display 44, as well as the user's functional focal range (i.e., the range of distances at which the user's eyes can focus properly on display 44). Focal range, in particular, may vary over time for the same user. Different users may also have different preferences about where the display should lie within the user's field of vision. A user's preferences about the placement of the display may change based on the task or conditions of the work the head-mounted display is being used for. As examples, lighting conditions, the need (or needlessness) of a wide, relatively unobstructed field of view, the relative importance of the information on the display to a particular task, and the nature and size of the informational images (e.g., text, photos, drawings, plans, blueprints, videos, etc.) being displayed may alter where the user prefers display 44 to lie. As such, it may be necessary for a user to set up the display not only the first time the user ever uses display 44, but also when setting up display 44 for a new task or new work conditions or if the user's vision or other attributes have changed. If the display is shared by two or more users, each user may have to reconfigure the display after it has been used by the other user. In addition, if the display 44 is configured to be moved between different articles of headwear (e.g., if the band or attachment is removable and/or can be used without an underlying head covering), changes in the presence, shape, design or size of the headwear may alter the user's preferences for display position.

The display 44 can be placed by the user in a preferred position and/or orientation. In order to do this, the display 44 can be positioned by donning headwear 20 and physically manipulating the display 44 into the desired position, e.g., with the user's hands or the hands of a human aide. Alternatively or additionally, the display 44 can be positioned by the user with system assistance. For example, actuators may respond to head gestures, visual cues, voice commands, keyboard or mouse clicks or other inputs in a set-up mode. Once in the preferred position and/or orientation, the position may be stored as a preferred position and/or orientation relative to a landmark identified by an optical or other input device, such as the user's eyebrow 80, eye socket 82, iris 84, cheekbone, ear, or other facial feature or as a position relative to the headwear 20 or any one or more portions of the head mounted display system.

The display 44 can be automatically positioned and/or oriented in a predetermined position. For example, a laser, optical sensor, or other input device 45 may be used to identify a landmark, such as the user's eyebrow 80, eye socket 82, iris 84, cheekbone, ear, or other facial feature, and adjust the display 44 to a predetermined position and/or configuration relative to the determined features of the identified landmark. If display 44 is positioned automatically, the user may have the option to adjust the automatically determined position, e.g., from a predetermined position to a preferred position.

The predetermined and/or preferred position and/or orientation can be defined based on determined features of the identified landmark, such as where identifiable features (e.g., iris, retina, eye, eye brow, nose, nostril, mouth, ears, cheeks, jawline) of the landmark are positioned within a frame of the optical input data, how the identifiable features are positioned relative to another, displacement value(s) of an optical lens when the optical input device is an eye tracking device, or any combination thereof, among other things. The computer processor(s) may be configured to automatically, or in response to a recognized voice command, determine a current position and/or orientation of the display relative to the identified landmark, and activate any number of the at least one actuator when the position and/or orientation of the display diverges by at least a predetermined variance from the preferred position and/or orientation defined relative to the identified landmark. The number of at least one actuator(s) can be activated to move the display by an amount that corresponds to a determined displaced value(s) of the current position and/or orientation, the determined displaced value(s) being determined based on a calculated variance, as explained in greater detail herein, between the current position and/or orientation and the defined preferred position and/or orientation.

In use, the display 44 would typically lie in a sub-arc 72 of the user's single-eye field of vision 70, as shown in FIG. 2B. As noted above, the desired position of the sub-arc 72 in the x-, y- and z-directions may be different for different users and/or different tasks, and, in particular, may differ for the same user when that user is performing different tasks. If display 44 is configured to rotate about one or more directional axes, the rotation or tilt of display 44 may also be adjusted, in addition to the position relative to the x-, y- and/or z-axes.

Figure 4:
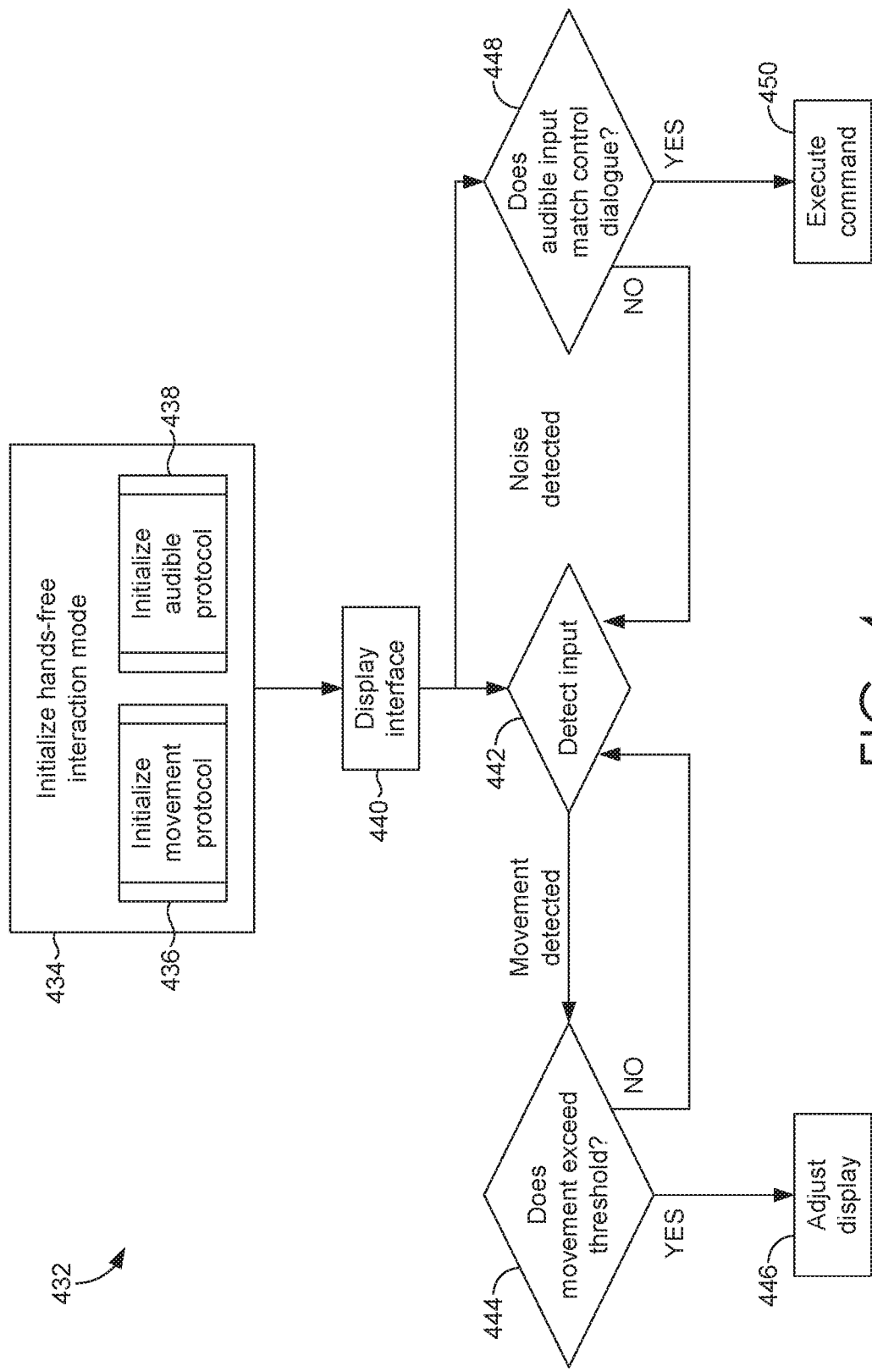
FIG. 4 is an exemplary flowchart illustrating the use of hands-free interaction between a user and a display according to aspects of the disclosure.

FIG. 4 outlines exemplary methods for hands-free modification of the display position during set-up and/or during use. Process 432 begins with step 434, initializing the hands-free interaction mode. The hands-free interaction mode may be initialized using configuration menu options during set-up, or may be initialized using voice commands, gestures, dedicated or shared buttons, switches, and/or other input devices during use. Initializing a hands-free interaction mode may involve initializing a movement protocol 436, initializing an audible (e.g., voice-activated) protocol 438, or both. During and/or following set-up of the display 44, a display interface is generated 440. Input components on the headwear may detect movement and/or audible commands. For example, the head mounted display system may comprise at least one accelerometer and/or gyroscope to detect motion, an optical sensor to detect gestures, and/or a microphone or membrane to detect sound. If sound is detected, the detection may be based on a series of non-verbal signals, such as clapping, snapping, whistling, or may be based on verbal signals, including speech recognition.

Once input is detected 442, the input is evaluated. Movement is evaluated against a pre-determined threshold 444. If the movement does not meet or exceed the pre-determined threshold, the system continues to monitor for movement input. If the movement does exceed the pre-determined threshold (for example, a movement of at least 10 mm, or a movement of at least 10 degrees rotation from the reference orientation or last measured orientation, or both), the display is adjusted 446 in accordance with the movement. For example, moving the head quickly up, or moving the head quickly up in a short sequence of two or three movements may cause the system to activate one or more of the actuators, such as actuator 34, to raise the display along the y-axis. However, if the head moves, but does not move far enough, fast enough, or in a timely series of repetitive movements (e.g., 3 nods, each approximately 0.5 seconds, spaced approximately 0.5 seconds apart), then the display is not moved. The number and timing of the movement(s) required to activate the movement-initiated display adjustment may be selected to allow for quick signaling, e.g., within 3-5 seconds or less, and to exclude common gestures that might be used without intent to activate the display adjustment, such as nodding yes or no, tilting the head to show interest or confusion, rolling the head to stretch the neck, etc.

Similarly, if noise is detected, the audible input is compared to the control dialogue 448. In this sense, the "dialogue" may be a series of non-verbal command noises, such as claps, snaps, whistles, clicks, or the like, or may be verbal commands, such as "raise display," "lower display," "tilt display up," etc. In some embodiments, the verbal commands must match pre-programmed commands to be recognized and acted upon by the system. In some embodiments, the user may speak naturally and the system may attempt to determine the intent of the speech from context or user history. If the audible input matches the control dialogue or can be parsed as an intended command, the command is executed 450. Otherwise, the system continues to monitor for audible input that might be a control signal.

Figure 5:
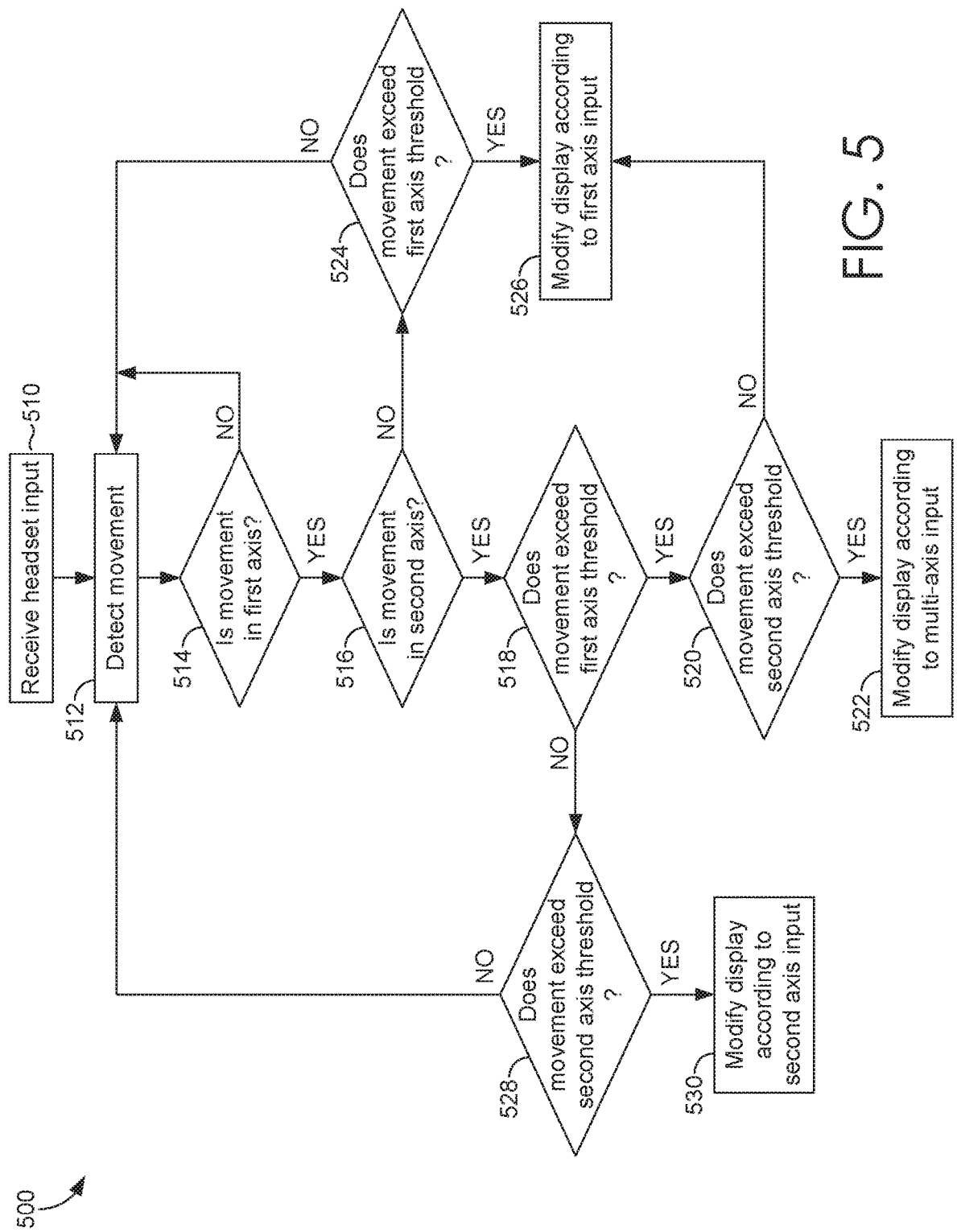
FIG. 5 is an exemplary flowchart for detection motion input according to aspects of the disclosure.

Turning now to FIG. 5, a block diagram is provided showing an exemplary multi-axis motion-based method 500 that facilitates hands-free adjustment of an adjustable display 44. As an illustrative example, a user wearing a head mounted display system initializes the hands-free control interface at block 510. The initial reference orientation of the head mounted display system is determined to be equivalent to facing forward in a neutral position.

I/O components 14 may include an accelerometer, a gyroscope, and/or other motion sensors. I/O components 14 may be used to determine the initial reference orientation of the headwear. Measurements taken over time by I/O components 14 can be compared to the initial reference orientation to determine changes in position over time, i.e., motion, including the speed and direction of movement, including rotational movement.

At block 512, the headwear detects movement. For instance, the user turns their head from neutral to the right and up simultaneously. At block 514, the system determines if the movement is in a first axis. For example, the movement in the first axis may be a rotation about the z-axis, from the initial reference position toward the x-axis (to the right of a user). In other words, the system may detect the user turned (rotated) their head from facing forward to the right. At block 516, the system determines if the movement also occurred in a second axis. For example, the movement in the second axis may be a rotation about the x-axis, from the initial reference position toward the z-axis (upward from the perspective of a wearer). In other words, the system may detect the user also (rotated) their head from a position substantially parallel to the y-axis toward the z-axis.

At block 518, the system determines if the movement in the first axis exceeded the first axis threshold. The first axis threshold may be, for example, predetermined to be +/−10 degrees from the initial reference position. If the system detects an displacement in the first axis beyond +/−10 degrees, the system determines that the threshold was exceeded. If the system detects a displacement in the first axis below +/−10 degrees, the system determines that the threshold was not exceeded. For example, if the user turned their head to the right by 20 degrees, the system would determine that the first axis threshold was exceeded.

At block 520, the system determines if the movement in the second axis exceeded the second axis threshold. The second axis threshold may be, for example, predetermined to be +/−10 degrees from the initial reference position. If the system detects a displacement in the second axis beyond +/−10 degrees, the system determines that the threshold was exceeded. If the system detects displacement in the second axis below +/−10 degrees, the system determines that the threshold was not exceeded. For example, if the user turned their head up by 20 degrees, the system would determine that the second axis threshold was exceeded.

At block 522, the system executes an adjustment in the position of display 44 with the multi-axis input. In some aspects, the multi-axis input may represent two independent adjustments (e.g., move display up and tilt display toward the user's right). In other aspects, the multi-axis input may represent a single adjustment (e.g., tilt display right). Continuing with the previous example, the multi-axis input—right and up—may correspond to moving one or more actuators a predetermined distance or degree of rotation. Repeated gestures may allow the user to adjust the display by more than the determined distance or rotation, or greater displacement (e.g., displacement in the second axis beyond +/−20 degrees) may signal a correspondingly larger adjustment in the position of the display 44.

Returning to block 516, if movement is only detected in the first axis the system determines if the movement exceeded the first axis threshold, at block 524. If the movement did not exceed the first axis threshold, the system returns to block 512. If the movement did exceed the first axis threshold, the system adjusts the position of the display 44 accordingly, at block 526.

Returning to block 518, if the detected movement does not exceed the threshold of the first axis the system proceeds to block 528. At block 528, the system determines if the movement exceeded the threshold of the second axis. If the movement did not exceed the second axis threshold, the system returns to block 512. If the movement did exceed the second axis threshold, the system adjusts the position of the display 44 accordingly, at block 530.

It will be understood that the examples provided in reference to exemplary method 500 represent only a subset of the possible multi-axis inputs and associated commands within the scope of the present disclosure; as such the examples are merely illustrative and not meant to be interpreted as limiting.

FIG. 6 presents a flowchart for a method 600 for automatically adjusting the position of a display 44. At 610, the system receives input from an input component 14. The input component 14 may be a laser, camera, optical sensor, or the like. In this particular instance, the input component 14 may be associated with display boom 26, frame 42 and/or display 44, and oriented such that the input component receives image and/or distance data for at least a portion of the user's face. An exemplary input component oriented in this manner is input device 45, shown in FIG. 2A.

At 612, the system identifies a landmark on the user's face. The landmark may be the eye 76, eyebrow 80, eye socket 82, iris 84, the ear or a portion of the ear, a hairline, cheekbone, etc. After a pre-determined period of time 614, the system receives from or prompts input device 45 for updated information at $T_n$ and identifies, at 616, the same landmark identified at $T_{n-1}$. The system determines whether the position of the landmark, such as iris 84, has changed in relation to the headwear 20, at 618, or to a specified point associated with headwear 20, such as a point on display 44. If the position has changed, the change in position is measured against positional and rotational thresholds, such as +/−10 percent, or +/−1 millimeter, at 622. If the change in position or orientation does not exceed the threshold, the system continues monitoring 620 the landmark. If the change in position or orientation does exceed the threshold, the system auto-adjusts the display 44 to the initial position relative to the landmark. After auto-adjusting the display 44, the system may resume monitoring 620 the landmark in case further adjustments are required.

Auto-adjustment of the display may involve moving the entire display, or may involve moving a portion of the display. For example, an optical image within a display may be tilted, rotated or repositioned, in addition to or in lieu of moving the display or display housing. Movement of the display or a portion of the display may involve rotational movement, movement along an axis, or tilt. It should be appreciated that a single actuator may be capable of adjusting two or more aspects of the position of the display. For example, a single ball joint may allow for modification of position, rotation and tilt.

By adjusting the position of the display 44 relative to a landmark on the user, the system can maintain or restore the desired position of the display even if the headwear 20 and/or band 25 are displaced. For example, in strong winds or tight spaces, the headwear may turn or tilt relative to the user's body, such that the display 44 is still in the pre-set position relative to the rest of the headwear, but is no longer in the desired sub-arc 72 of the user's field of vision 70. If the position of the display 44 is maintained relative to the user's body, such as the user's iris 84, eye 76, eyebrow 80 or eye socket 82, then the display should remain within a tolerable variance from the original position specified by the user relative to the user's field of vision 70.

The position of the display 44 may be maintained automatically, by means of one or more instructions from the at least one processor being provided to at least one actuator to move one or more portions of the wearable computing device in response to a determination that the position of the display relative to the user's body has varied from the predetermined or preferred position and/or orientation. In such an instance, the at least one processor may utilize any one or more of the at least one accelerometer and/or gyroscope and optical sensor to calculate the displaced value(s) of the current position and/or orientation, the displaced value(s) being determined based on the calculated variance between the predetermined or preferred position and/or orientation and the current position and/or orientation. The displaced value(s) can then be used by the at least one processor to automatically cause the at least one actuators to restore the display 44 to the predetermined or preferred position and/or configuration.

The position of the display 44 may also be maintained manually. At least one accelerometer and/or gyroscope in the headwear 20 or head mounted display system may be used to determine that a user has provided motion-based instructions that the display 44 be restored to its predetermined or preferred position and/or orientation. An optical sensor, such as a front-facing camera, may be used to determine that a user has provided gesture-based instructions, such as a hand gesture, that the display 44 be restored to its predetermined or preferred position and/or orientation. An audio sensor may be used to determine that a user has provided sound-based instructions, such as speech, that the display be restored to its predetermined or preferred position and/or orientation. Any instruction provided by the user to restore the display 44 to its predetermined or preferred position and/or orientation may cause the at least one processor to cause at least one actuator to be activated and move the display 44 by an amount that corresponds to the determined displaced value.

If desired, the display 44 can be automatically adjusted to a commonly preferred position during initial set-up, or to a selected common position, such as just above the user's line-of-sight, just below the user's line-of-sight, or in the user's line-of-sight. When automatic positioning is used, either during set-up or during use, the user may make further adjustments to the position of display 44 manually, using audible commands, using motion commands, using gesture commands or combinations thereof. Once the position of the display 44 is confirmed by the user, the position may be saved relative to another aspect or aspects of headwear 20 or relative to one or more user landmarks, such that the system can automatically reposition the display 44 to the user-preferred position in the future. User preferences can be saved to memory 4 on the system or can be saved to a remote memory, such as a server or remote database, for later access by the communications components of the system, such as radio 10. In some aspects, it may be desirable to save all display position information, or most display position information, to local memory to reduce the amount of bandwidth consumed in transferring information to and from a remote memory during use, and to reduce latency when making adjustments (as local memory is often somewhat faster to access than remote memory). Users may be permitted to save multiple preferred settings. If multiple settings are saved, the user may be able to use pre-set identifications or user-specified names for each setting, e.g., "bright light," "video," "work at height," etc. for ease of identifying which settings should be recalled for a particular task or circumstance. The system can then activate actuators 32, 34, 38, 40 to move display boom 26 or portions of display boom 26 to position display 44 accordingly.

As described, an auto-adjustment process may have three modes: initial set-up, in which user adjustments to a recommended display position may be expected to fully customize the set-up for an individual, gross modality, in which a pre-configured position for a particular user is restored, for example, after the device has been used by a different user, and minor modality, in which a pre-configured position is maintained in or returned to a specified position during use. Minor modality may involve real-time adjustments made, for example, every 5 seconds, or every 30 seconds, or every 1-3 minutes. Both gross modality and minor modality may be invoked. For example, a user may wish to move the entire display boom out of sight, or move the display largely out of the field of vision, and then return the display to a visible position. Frequent adjustments could be distracting to the user, and so the user may be able to set a desired timeframe for adjustments, which could be real-time (no intentional delay, with any actual delay due to system response time), or adjustments may be made only on user command. As described previously, user commands could be given orally, using gestures, or using more conventional inputs, such as keyboard or button entries, mouse clicks, touchscreen activation, etc.

A head-mounted display as described herein may be useful in a variety of settings, including, without limitation, construction, maintenance, research, exploration, recreation, medicine, engineering, manufacturing, or any activity or conditions where reserving the use of the user's hand(s) is desirable. Such a display might also be useful for people with temporary or permanent physical restrictions, including difficulty using hand(s) or finger(s), or the absence of hand(s) or finger(s), or in situations where it may be impractical for the user to manually adjust a display, such as underwater or in low-oxygen environments, including outer space.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A head mounted display system, comprising:
   a display portion;
   a body portion housing at least one processor, the body portion housing at least one of a gyroscope and an accelerometer operable to communicate generated orientation data and/or position data corresponding to a detected orientation and/or position of at least one of the body portion and the display portion to the at least one processor;
   at least one input device coupled to the at least one processor;
   a display boom having a first end adjustably coupled to the body portion to form a first joint, and a second end adjustably coupled to the display portion to form a second joint, the adjustably coupled first and second ends facilitating adjustability of the display portion relative to the body portion;
   at least one actuator electronically coupled the at least one processor, each actuator being mechanically coupled to at least one of the display portion and the display boom to facilitate automated adjustment of the display portion relative to the body portion based at least in part on a portion of generated input data communicated from the at least one input device to the at least one processor and on the communicated orientation data and/or position data.

2. The head mounted display system of claim 1, further comprising at least one computer storage media storing computer-usable instructions that, when used by the at least one processor, cause the at least one processor to generate adjustment instructions for communication to the at least one actuator based at least in part on the portion of communicated input data.

3. The head mounted display system of claim 2, wherein an input device includes an audio input device or an optical input device.

4. The head mounted display system of claim 3,
   wherein the optical input device is operable to detect visual information to generate the portion of input data,
   wherein the at least one processor is configured to determine a measure of displacement from a defined preferred position based at least in part on the detected visual information, and
   wherein the automated adjustment of the display portion is facilitated based further in part on the determined measure of displacement.

5. The head mounted display system of claim 4, wherein the audio input device includes a microphone, and wherein the at least one processor is configured to define the preferred position based on a voice command received via the microphone, the received voice command causing the at least one processor to detect at least one fixed reference point of a wearer based on additional detected visual information.

6. The head mounted display system of claim 5, wherein a fixed reference point corresponds to a facial feature of the wearer.

7. The head mounted display system of claim 4,
   wherein the at least one processor is configured to detect a predefined head gesture based on the communicated orientation data and/or position data, and is further configured to generate additional adjustment instructions for communication to the at least one actuator to cause movement of at least one of the display portion and the display boom from a current position to a retracted position.

8. A computer-implemented method for positioning a head-mounted display, comprising:
   identifying, by the wearable computing device, at least one facial feature of a wearer of the head-mounted display based on optical data received from an optical input device secured to a display portion of the wearable computing device, the display portion being adjustably secured to a display boom extending away from a body of the wearable computing device;
   determining, by the wearable computing device, a set of relative displacement values corresponding to the identified at least one facial feature based at least in part on additional optical data received from the optical input device;
   generating, by the wearable computing device, instructions to activate at least one actuator coupled to at least one of the display portion and the display boom, the at least one actuator being activated to move at least one of the display portion and the display boom to a position and/or orientation determined based at least in part on the determined set of relative displacement values.

9. The computer-implemented method of claim 8, wherein a facial feature includes an iris, a nose, an eyebrow, an ear, a jaw line, or a facial marking.

10. The computer-implemented method of claim 8, wherein the position and/or orientation is determined based further in part on motion data received from at least one of an accelerometer and a gyroscope of the wearable computing device.

11. The computer-implemented method of claim 10, wherein at least one of the accelerometer and the gyroscope is disposed in an enclosure of the display portion.

12. The computer-implemented method of claim 8, wherein the additional optical data is live optical data.

13. The computer-implemented method of claim 8, wherein the identifying, determining, and generating are performed based on a received voice command determined to correspond to a selective readjustment of the display portion.

14. The computer-implemented method of claim 8, wherein the optical input device is an eye-tracking device.

15. The computer-implemented method of claim 8, wherein the at least one facial feature is identified based on a first received voice command, and the set of relative displacement values is determined to generate the instructions based on a second received voice command.

16. A computer-implemented method for hands-free readjustment of a head-mounted display, the method comprising:

receiving, by a wearable computing device, audible input data from an audio input device coupled to the wearable computing device when a body portion of the wearable computing device is donned on a head of a user;

determining, by the wearable computing device, that the received audible input data corresponds to a voice instruction for defining a preferred orientation and/or position of an adjustable display portion of the wearable computing device;

identifying, by the wearable computing device, the facial landmark of the user in response to the determination that the received audible input data corresponds to the voice instruction, the facial landmark being identified in a first portion of optical data received via an optical input device coupled to the adjustable display portion;

defining, by the wearable computing device, a preferred orientation and/or position of the adjustable display portion based at least in part on a determined set of features corresponding to the identified facial landmark, the preferred orientation and/or position being defined relative to the identified facial landmark; and generating, by the wearable computing device, at least one instruction to move one or more actuators, coupled at least in part to the display portion, an amount that repositions the adjustable display portion back to the defined preferred orientation and/or position based on a calculated set of displacement values, the set of displacement values being calculated based at least in part on another determined set of features corresponding to the facial landmark identified in further optical data received via the optical input device.

17. The computer-implemented method of claim 16, wherein the preferred orientation and/or position is defined further in part on position data received from at least one of a gyroscope and accelerometer coupled to the display portion, and wherein the set of displacement values is calculated based further in part on additional position data received from at least one of the gyroscope and accelerometer.

18. The computer-implemented method of claim 16, wherein the at least one instruction is generated in response to another determination that additional received audible input data corresponds to another voice instruction for repositioning the adjustable display portion.

19. The computer-implemented method of claim 16, wherein the at least one instruction is generated at a predefined time interval.

* * * * *